United States Patent Office 3,804,881
Patented Apr. 16, 1974

3,804,881
POLYMERIZATION USING VARYING
MONOMER CONCENTRATION
David Robinson Bassett, Charleston, and Kenneth Look
Hoy, St. Albans, W. Va., assignors to Union Carbide
Corporation, New York, N.Y.
No Drawing. Filed June 20, 1972, Ser. No. 264,605
Int. Cl. C08f 1/06
U.S. Cl. 260—470 A 13 Claims

ABSTRACT OF THE DISCLOSURE

Polymers are produced by continuously introducing primary polymerizable feed composition from a primary feed source to a polymerization zone, said primary polymerizable feed composition continually varying in compositional content during the continuous introduction; simultaneously adding to the primary feed source a different secondary polymerizable feed composition from a secondary feed source so as to continually change the compositional content of reactants in the primary feed source, and polymerizing the reactants introduced to the polymerization zone.

BACKGROUND OF THE INVENTION

The history of the commercial manufacture of synthetic polymers can be traced back to the last century. During this intervening period many different processes have been developed and many novel polymers have been discovered. In spite of this multitudinous growth in processes and products there is still a huge effort being made to improve existing processes and products and to discover new ones.

Common polymerization processes involve the introduction of a monomer or mixture of monomers to a reaction vessel where the reaction is permitted to proceed. There can be present in the reaction vessel catalysts, initiators, activators, emulsifying agents, dispersing agents, suspension agents, diluents or solvents, colorants, or any of a host of known compositions used to further the polymerization or to produce a particular type of polymer.

A great number of the polymers produced are the reaction products of two or more polymerizable reactants, and in this specification the generic term polymer is used in referring to them. Such polymers have been produced by a number of processes, including suspension polymerization, emulsion polymerization, dispersion polymerization, solution polymerization, bulk polymerization in the absence of any solvent, and variations or combinations of these and other known polymerization processes. These processes are also known to be performable continuously or in a batch-wise manner. The processes have also varied in the manner in which the reactants are introduced into the reactor, with usage depending upon the particular reactants or process employed or the whims of the practitioner.

Among the common methods employed one can mention that procedure wherein the mixture of polymerizable reactants and additives is placed in the reactor and the reaction permitted to proceed at selected temperature and pressure conditions. Another method is that wherein one or more of the polymerizable reactants is in the reactor and one or more different polymerizable reactants is introduced continuously or discontinuously into the reactor and the reaction permitted to proceed at selected temperature and pressure conditions. A further method involves a step-wise or stage procedure such as is described in U.S. 3,448,173, U.S. 3,562,235, Netherlands 763,809, Belgian 770,035 or French 2,069,007 wherein different reactants are introduced into the reactor at different stages of the reaction. A still further method is that method wherein separate streams of different reactants are added to the reactor at specific constant feed rates. In addition to those procedures spelled out above, variations thereof are known; also known are many other procedures and variations too numerous to mention. In all of the procedures known and disclosed in the art there is one characteristic that is common to all when a mixture of monomers is added to the reactor, this characteristic is that the compositional content of the mixture added is essentially constant and does not vary; there is essentially no variation in the ratio of the concentrations of each reactant in the mixture of monomers being fed to the reactor and the ratio is maintained at a constant value throughout the addition period of said mixture to the polymerization zone.

SUMMARY OF THE INVENTION

It has now been found that non-uniform copolymers can be produced by continuously introducing at least one primary polymerizable feed composition from at least one primary feed source to a polymerization zone, which primary polymerizable feed composition is continually varying in compositional content of the reactants therein, while simultaneously adding to at least one primary polymerizable feed composition in at least one primary feed source at least one different secondary polymerizable feed composition from at least one secondary feed source so as to continually change the compositional content of the reactants of said primary polymerizable feed composition in said primary feed source, and polymerizing the primary polymerizable feed composition that has been introduced into the polymerization zone.

DESCRIPTION OF THE INVENTION

The process of this invention enables a polymerization scientist to control the polymerization process in such manner that he can produce polymers having the chemical structures and physical properties desired. The polymers are produced by a process in which the concentrations of the polymerizable reactants in the primary polymerizable feed composition are continually changing during the introduction of said primary polymerizable feed mixture to the polymerization zone by the simultaneous addition of a different secondary polymerizable feed mixture to the primary polymerizable feed mixture. The distinguishing feature of this process is the introduction of primary polymerizable feed mixture to the polymerization zone from a primary feed source while simultaneously introducing at least one different secondary polymerizable feed composition from a secondary feed source to the primary polymerizable feed composition in the primary feed source.

The polymerization zone is any reactor, properly equipped, that can be used for the production of polymers. The different types of reactors and their suitability for a particular polymerization reaction are well known to those skilled in the art and do not require elaboration herein. Connecting to the polymerization reactor is at least one primary feed source. The term primary feed source defines one or more tanks or source of polymerizable reactants feeding directly into the polymerization zone or reactor, for example, it can be an in-line mixer or a tank. The primary feed source is equipped with efficient mixing means to assure adequate mixing of the contents thereof. Connecting, in turn, to any of the primary feed sources is at least one secondary feed source. The term secondary feed source defines one or more tanks or sources of polymerizable reactants feeding to any of the primary feed sources. There can be one or more secondary feed sources with all of the secondary feed sources feeding directly into the primary feed source, or one or more of the secondary feed sources can feed in series to another secondary feed source and thoroughly mixed therein with finally an ultimate secondary feed source feeding directly into one or more of the primary feed sources. The rate of feed from any one feed source to any other feed source or tank, whether primary or secondary, can be varied at the will of the skilled scientist to meet his desires and objectives. The configurations that can be engineered are many; however, in all instances there must be a polymerization zone or reactor connected to at least one primary feed source or tank equipped with mixing means which in turn is connected to at least one secondary feed source or tank which secondary feed sources (when more than one thereof is used) can all or in part feed directly into one or more of the primary feed source or tank or can feed in series into one another and ultimately feed into the primary feed source or tank.

The primary polymerizable feed composition is the mixture of reactants present at any particular time in the primary feed source or tank. This mixture can contain the polymerizable reactants alone or it can include any additive which will not have a deleterious effect on the polymerizable reactants, for example, diluents or solvents, colorants, dispersion or emulsion agents, antioxidants, stabilizers, chain transfer agents, crosslinkers, initiators, one of the components of a redox catalyst system, and the like. The compositional content of the primary polymerizable feed composition is continually changing as secondary polymerizable feed composition is fed into and mixed with it. By the term compositional content is meant the content or concentration in the polymerizable feed composition of each reactant therein. As becomes apparent from this teaching and description the simultaneous feeding of primary polymerizable feed composition from the primary feed source to the polymerization zone and feeding of a different secondary polymerizable feed composition from the secondary feed source to the primary feed source will result in a continual change of the content or concentration of each reactant present in the primary polymerizable feed composition or in the compositional content of the primary polymerizable feed composition. This continual change in compositional content can also occur in the secondary polymerizable feed compositions when more than one thereof is being used and they are feeding in series into each other before ultimately feeding into the primary polymerizable feed composition.

The secondary polymerizable feed composition is the mixture of reactants present at any particular time in any one or more of the secondary feed sources or tanks and can contain the same types of additives that were previously indicated could be present in the primary polymerizable feed composition. It should be remembered, however, that if one of the polymerizable feed mixtures contains one of the components of a redox catalyst system that the other such mixture cannot contain the other component thereof, otherwise polymerization will occur in the feed tanks before the polymerizable reactants are introduced into the polymerization zone.

As indicated, in the process of this invention there are used primary polymerizable feed compositions and secondary polymerizable feed compositions. The primary polymerizable feed composition can initially contain a single polymerizable reactant or it can initially contain a plurality of polymerizable reactants; the same is true for the initial content of the secondary polymerizable feed composition. However, when the primary polymerizable feed composition is a single reactant the secondary polymerizable feed composition cannot be solely that same single reactant, it can be a different single reactant or a mixture of a plurality of reactants that can include that same reactant in the mixture. Likewise, when the primary polymerizable feed composition is a mixture of a plurality of reactants the secondary polymerizable feed composition cannot be that same mixture having the same concentrations for each reactant, it can be a single reactant or it can be a different mixture of reactants or it can be a mixture of the same reactants but at different initial concentrations of the reactants. The important and ever present factor is that the initial compositional contents of the primary polymerizable feed composition and of the secondary polymerizable feed composition are always different, they are not initially identical in make-up of polymerizable reactants.

As a result of the initial differences in the compositional contents of the primary and secondary polymerizable feed compositions and of the simultaneous addition of secondary polymerizable feed composition to primary polymerizable feed composition while the primary polymerizable feed composition is introduced into the polymerization zone there is a continual variation in the compositional content of the primary polymerizable feed composition. Hence, any portion of the primary polymerizable feed composition entering the polymerization zone is at all times different than the portion that preceded it and the portion that succeeds it. Consequently, the composition of the polymer produced in the reactor during the addition is likewise continuously changing and reflects the composition of the primary polymerizable feed composition entering the polymerization zone. In a rapid polymerization reaction, one wherein there is essentially instantaneous reaction of the monomers when they are introduced to the polymerization zone, one has what is known as a monomer starved system. In other reactions one may have a so-called monomer rich system, i.e., a system in which there is some time delay between introduction of the reactants to the polymerization zone and essentially complete polymerization of the reactants. Thus, in a monomer starved system the polymer produced at any one period of time differs in constitutional content from the polymer produced prior to that period of time or subsequent to that period of time. However, in a monomer rich system the composition of the polymer formed at any instant is dependent upon the concentration of each monomer in the polymerization zone and the respective reactivity of each monomer present therein in relation to the other monomers. There are thus produced certain novel non-uniform polymer compositions of polymer molecules having infinite variation in molecular structures. The instant invention provides a novel process for the production of polymers and certain novel non-uniform polymers themselves. By the term infinite variation in molecular structures is meant the mixture of the infinite number of different polymers that is produced in the polymerization zone by our process. By the term non-uniform is meant that polymer molecules formed at any one time during the polymerization reaction are not the same as polymer molecules formed at any other time.

The process of the invention can be described in its simplest manner by a reaction involving a single primary feed source initially containing a single polymerizable reactant and a single secondary fed source initially containing a single different polymerizable reactant. The contents in the primary feed source or tank at any time during the process are known as the primary polymerizable feed composition and the contents of the secondary feed source or tank are known as the secondary polymerizable feed composition. Secondary feed source feeds into primary feed source by suitable lines and pumps; primary feed source is equipped with an efficient stirrer or mixer and feeds into the polymerization zone. At the start of the polymerization reaction the flow of primary polymerizable feed composition from primary feed source to the polymerization zone is commenced at a predetermined rate, simultaneously the flow of secondary polymerizable feed composition from secondary feed source to the primary feed source is initiated and this rate of flow can be the same as or different than the rate of flow from the primary feed source to the polymerization zone. As the secondary polymerizable feed composition enters the primary feed source it is thoroughly mixed with the contents thereof resulting in a continual change in the compositional content of the primary polymerizable feed composition. This continually changing primary polymerizable feed composition is simunltaneously and continuously entering the polymerization zone and the polymer produced therein is varied in accord with the compositional content of the reactants mixture in the polymerization zone. As is apparent from the prior description either or both of the primary or secondary feed source can contain more than one polymerizable reactant.

The variations in the engineering arrangements of the primary and secondary feed sources are innumerable and no attempt will be made to set forth each specific tank configuration or arrangement possible; these can readily be devised by skilled individuals at will for the purpose of obtaining maximum operational efficiency or for the purpose of obtaining products having certain desired properties. In the preceding paragraph there has been outlined a simple arrangement employing a single primary feed source and a single secondary feed source. Slightly more complex arrangements would be those wherein there was a single primary feed source and a plurality of secondary feed sources; in these instances all of the secondary feed sources could be feeding in parallel directly into the primary feed source or some of the secondary feed sources could be feeding in series to other secondary feed sources with at least one secondary feed source, whether in series or not, ultimately feeding directly into the primary feed source. Other arrangement would be those wherein there were a plurality of primary feed sources; in these instances there could be a single secondary feed source feeding into one or more of the plurality of the primary feed sources, or there could be a plurality of secondary feed sources all feeding in parallel directly into only one of the primary feed sources, or a plurality of secondary feed sources directly feeding into more than one primary feed source or all of the plurality of secondary feed sources could be feeding in series into only one of the primary feed sources, or the plurality of secondary feed sources can be feeding in series into more than one of the primary feed sources. When a plurality of secondary feed sources is used they can be used in any combination desired, all can be used in series, some can be used in series while others are not, or none need be used in series with all of them being added directly to the primary feed source. In all instances the primary feed sources feed the primary polymerizable feed composition to the polymerization zone; the secondary feed sources feed the secondary polymerizable feed composition directly to the primary feed source or in series to another secondary feed source with the reactants therein ultimately terminating in the primary feed source before entering the polymerization zone. During these movements of reactants from one feed source to another there is a resultant continual change in the compositional content of the contents of the tank to which polymerizable reactant is added and the contents of the tanks are agitated to obtain efficient mixing of the contents therein. One can also vary the process by having periods of time at the start, during, or near the end of the reaction wherein there is feeding of primary polymerizable feed composition from the primary feed source into the polymerization reactor without any simultaneous feeding of secondary polymerization feed composition into the primary feed source or tank for a selected period of time. In addition, the flow rates between feed tanks or polymerization zone can be varied at will at any time during the polymerization reaction. One can also, with suitable known means, using variable feed valves, feed polymerizable reactants from a plurality of secondary feed sources through an in-line mixer which serves as the primary feed source wherein the primary polymerizable feed composition is produced. The in-line mixer then feeds the primary polymerizable feed composition directly into the polymerization zone.

In the process of this invention non-uniform polymers are produced in a controlled manner. By the term non-uniform polymer is meant a polymer composition produced by the reaction of a polymerizable reactants mixture which during a portion of the polymerization period is continually changing in compositional content. The polymer produced by this process can have unexpected properties; it has been observed that they often have broader use temperature ranges than similar polymers produced by the conventional processes used in the past. In addition, it was found that one can design polymers which yield articles possessing a high degree of hardness accompanied by considerable impact strength or flexibility. It was further found that polymers having satisfactory and desirable properties can be produced from mixtures of polymerizable reactants that in the past could not be used to obtain satisfactory polymers. One of the properties of particular interest in polymers, especially in coating polymers, is the glass transition temperature. In a conventionally produced random copolymer the glass transition is generally observed at a definite temperature at which some physical property changes abruptly; for instance, if the stiffness of a polymer film is measured with increasing temperature, a temperature is reached where the film loses its rigidity and suddenly becomes more flexible. As the temperature is increased, the film will then begin to flow and lose its self-supporting film characteristic, it is no longer a film. That region in which a film possesses a useful degree of flexibility is called the use temperature range, and since random copolymers generally have an abrupt transition, their useful temperature range is generally quite narrow. As a result, polymers which are flexible at a given temperature are often too soft for certain applications while polymers possessing the desired hardness are not flexible enough. A broad use range is often desirable so that use of the polymer is not unduly restricted by temperature. The instant process permits the production of polymers having the desired hardness and sufficient flexibility over a broader temperature range than those previously produced. The glass transition temperatures of polymers produced by this invention were broader when compared with similar polymers prepared by conventional methods and hence had wider use temperature ranges. The glass transition temperatures were determined by the torsion pendulum and stiffness-temperature techniques (ASTM–D 2236 70, as modified by Faucher and Koleske, Physics & Chemistry of Glasses, vol. 7, No. 202).

An area in which this invention is of major interest is in the polymerization of monomers with widely different properties. Thus, it is known that some monomers produce "hard" polymers while some monomers produce "soft" polymers. For the purposes of this invention a hard monomer is one which produces a homopolymer having a glass transition temperature that is at least about 10° C. higher than the glass transition temperature of the homopolymer produced from the soft monomer. Thus, a copolymer of a hard monomer and a soft monomer is one whose monomers would produce homopolymers having said stated difference in glass transition temperatures. By the use of the processes of this invention hard and soft monomers have been emulsion polymerized to form polymers having a broad glass transition temperature range that are quite flexible at room temperature and which do not exhibit surface tack when used as coatings. In addition, films possessing a high degree of hardness while still retaining excellent impact strength properties have also been prepared. The process also enables one to unite basically incompatible monomers for the production of useable polymers by virtue of the continuous change in composition of the polymer being produced during the polymerization reaction. In emulsion polymerizations the processes of this invention enables one to control the colloidal and film-forming properties of the polymer particles. This can be attained without affecting the film-forming properties when internal crosslinking monomers are employed by ensuring a steady decrease in crosslink concentration as the particles grow by continually decreasing the concentration of crosslinker in the primary polymerizable feed composition. In addition, the use of higher acid levels in the polymerization medium is facilitated by decreasing the flexibility of the growing polymer as the acid concentration increases by better control of the reactants added. Excessive swelling of the polymer particles in the emulsion is thereby reduced even when the pH of the latex is raised. It was observed that the acrylic acid content of a styrene/ethyl acrylate/acrylic acid/neopentyl glycol diacrylate polymer could be raised to about ten weight percent or more without a concomitant increase in viscosity observed in a similar polymer produced by the prior conventional processes when only two to four percent acrylic acid is present. At a pH of about ten latex compositions produced by the process of this invention had a sufficiently low Brookfield viscosity that they could be used commercially even when they contained as much as ten percent acrylic acid in the polymer. Whereas, latex composition produced by the prior conventional processes could not be used commercially because they were almost putty-like in nature with as little as two to four percent acrylic acid content. The incorporation of functional groups on the surface of the polymer particles, for example for external cross-linking or adhesion promotion, can also be controlled by gradually and continually increasing the concentration of reactants containing such groups in the primary polymerizable feed composition towards the end of the polymerization reaction.

The processes of this invention can be used to polymerize any mixture of polymerizable reactants that will co-react or copolymerize with each other at a rate such that there is no substantial build-up of any one reactant or group of reactants while the other reactants are reacting and forming polymer. The invention is not restricted to any limited group or class of polymerizable reactants, the process is broad in its application and use.

The concentrations of a particular polymerizable reactant initially present in the primary polymerizable feed composition or initially present in the secondary polymerizable feed composition can vary from 0.01 weight percent to 100 weight percent based on the total weight of polymerizable reactants initially present in the particular feed stream. These concentrations can be varied at the will of the skilled individual, as is recognized in the art, to obtain the particular final concentrations of each reactant in the polymer or to obtain a particular property or characteristic in the polymer. The rate of flow from secondary feed sources and from primary feed sources can also be varied at the will of the skilled individual and do not require elaborate discussion herein. The process employs the temperature and pressure conditions known suitable for the reactants employed.

Among the polymerizable reactants that can be used in the process of this invention are those containing at least one polymerizable carbon-to-carbon unsaturated bond. These compounds are well known and any attempt to list them all would be unnecessary. Illustrative thereof, however, one can mention the unsaturated compounds such as ethylene, propylene, 1-butene, 2-butene, isobutylene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, vinylnaphthalene, 4-methylstyrene, 2,4-dimethylstyrene, 3-ethylstyrene, 2,5-diethylstyrene, 2-methoxystyrene, 4-methoxy-3-methylstyrene, 4-chlorostyrene, 3,4-dimethyl-alpha-methylstyrene, 3-bromo - 4 - methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinyl-naphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-phenoxyethyl acrylate, trimethoxysilyloxypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alpha-chloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy)$_{12}$ acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethene, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, phenyl ketone, methyl alpha-chlorovinyl ketone, ethyl vinyl ketone, divinyl ketone, hydroxymethyl vinyl ketone, chloromethyl vinyl ketone, allilydene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinyl ether of ethylene glycol or diethylene glycol or triethanolamine, cyclohexyl vinyl ether, benzyl vinyl ether, phenethyl vinyl ether, cresyl vinyl ether, hydroxyphenyl vinyl ether, chlorophenyl vinyl ether, napthyl vinyl ether, dimethyl maleate, diethyl maleate, di-(2-ethylhexyl) maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfonate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine, 1-vinyl pyrene, 2-isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptans, divinyl sulfoxide, vinyl phenyl sulfoxide, vinyl chlorophenyl sulfoxide, methyl vinyl sulfonate, vinyl sulfoanilide, and the like. In some instances, the particular monomer used may desirably be at a concentration below about two percent by weight to avoid unduly high viscosities of the latex. As an illustration, the presence of ten weight percent vinyl pyridine results in a thick viscous mass at low solids content even though the latex composition appears to be forming satisfactorily at the start of the polymerization reaction.

The polymerizable feed compositions can contain in the usual known amounts, crosslinkers, dispersion aids, emulsifiers, photosensitizers, colorants, activators, catalysts, and other additives conventionally used in polymerization reactions, all of which are known as is their use. Among the crosslinkers one can mention divinyl benzene, acrylyl or methacryl polyesters of polyhydroxylated compounds, divinyl esters of polycarboxylic acids, diallyl esters of polycarboxylic acids, triallyl cyanurate, allyl acrylate, allyl methacrylate, diallyl terephthalate, N,N′-methylene diacrylamide, 1,2-ethylene diacrylate, diallyl maleate, diallyl fumarate, hexamethylene bis maleimide, triallyl phosphate, triviny trimellitate, divinyl adipate, trimethylolpropane triacrylate, glyceryl trimethacrylate, diallyl succinate, and the like.

Any of the known dispersion agents can be used at the conventional concentrations, hydroxyethyl cellulose, carboxymethyl cellulose, poly(vinyl alcohol), methyl cellulose, sulfated cellulose, and the like.

Any of the known emulsifiers can be used at a total concentration preferably below one percent by weight besed on the total weight of polymerizable reactants charged. Among the useful emulsifying agents there are included soaps, sulfonated alkylbenzenes, alkylphenoxyethyl sulfonates, sodium lauryl sulfonate, salts of long chain amines, salts of long chain carboxylic or sulfonic acids, allylphenol ethoxylates, linear alcohol ethoxylates, or any other emulsifying agent.

The particular catalyst to be used depends on the polymerizable reactants. It can be a free radical initiator, or a redox catalyst, or from whichever class of catalyst is necessary for the particular reaction. The catalysts themselves are not the instant invention and as is recognized in the art the particular catalyst depends on the type of polymerization being carried out and the reactants used. The catalysts are employed in the conventional manner at the conventional concentrations. Illustrative of suitable free radical initiators one can mention hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2, 5-bis(hydroperoxy)hexane, perbenzoic acid, t-butyl peroxypivalate, t-butyl peracetate, azo-bis-isobutyronitrile, ammonium persulfate, potassium persulfate, sodium persulfate, sodium perphosphate, and the like. Illustrative of suitable redox catalysts are sodium persulfate-sodium formaldehyde sulfoxylate, cumene hydroperoxide-sodium metabisulfite, hydrogen peroxide-ascorbic acid, and the like.

The processes of this invention can be used to carry out emulsion polymerization reactions, aqueous and non-aqueous dispersion polymerization reactions, suspensions polymerization reactions, solution polymerization reactions, bulk polymerization reactions, using the known basic concepts for these reactions but carrying out the reactions according to the procedures herein taught. The basic concepts for each process are so well known that they do not require any further detailed description herein and when coupled with the teachings of the instant invention one skilled in the art of polymer production has a clear understanding of the instant invention. The solid polymers can be recovered by conventional means.

The following examples serve to further illustrate the invention. Parts are by weight unless otherwise specified.

EXAMPLE 1

The polymerization reaction system consisted of a polymerization reactor or zone equipped with a stirrer, thermometer, nitrogen inlet, inlet for polymerizable reactants and reflux condenser. Connecting directly to the polymerization reactor through the inlet for the polymerizable reactants was the primary feed tank or source which was equipped with a stirrer and connecting into the primary feed source was the secondary feed tank or source.

There were charged to the polymerization reactor 610 parts of boiled distilled water, 0.75 part of the dioctyl ester of sodium sulfosuccinic acid and 0.75 part of ammonium persulfate. The primary polymerizable feed composition in the primary feed source had an initial content of 443 parts of butyl acrylate, 7 parts of acrylic acid and 1.5 parts of dioctyl ester of sodium sulfosuccinic acid. The secondary polymerizable feed composition in the feed source had an initial content of 490 parts of methyl methacrylate, 10 parts of acrylic acid and 1.5 parts of the dioctyl ester of sodium sulfosuccinic acid. The contents of the polymerization reactor were heated to 80° C. and the system was purged with nitrogen. Primary polymerizable feed composition from primary feed source was fed into the polymerization reactor at a rate of 5 ml. per minute. Simultaneously, secondary polymerizable feed composition from secondary feed source was fed into the primary feed source at a rate of 5 ml. per minute and thoroughly mixed therein. The feeding sequences caused a continual change in the compositional content of the reactants of the primary polymerizable feed composition present in primary feed source during the reaction and thus a continual change in the compositional content of the reactants entering the polymerization reactor. After a total of 500 parts of primary polymerizable feed composition had been fed into the polymerization reactor, the feed thereto was stopped and the contents thereof were reacted for another hour at 80° C. with stirring. At the end of the addition of primary polymerizable feed composition to the polymerization reactor, the secondary feed source or tank was empty and the primary feed source still contained about 450 parts of unreacted polymerizable reactants that were not used. The product was a fluid, milky latex of a methyl methacrylate (39)/butyl acrylate (59)/acrylic acid (2) polymer having a total solids content of 45 weight percent. A 1.5 mils thick dry film produced from this latex by spreading with a doctor blade was flexible and non-tacky.

EXAMPLE 2

(A) The equipment used was similar to that described in Example 1. The polymerization reactor was initially charged with 950 parts of boiled distilled water and one part of the dioctyl ester of sodium sulfosuccinic acid, heated to 80° C., purged with nitrogen and then 1.0 part of ammonium persulfate were added. The primary polymerizable feed composition initially present in primary feed source was made up of 64 parts of methyl methacrylate, 364 parts of butyl acrylate, 9 parts of acrylic acid and two part of the dioctyl ester of sodium sulfosuccinic acid. The secondary polymerizable feed composition initially present in secondary feed source was 249 parts of methyl methacrylate, 107 parts of butyl acrylate, 7 parts of acrylic acid and 1.5 part of the dioctyl ester of sodium sulfosuccinic acid. The primary polymerizable feed composition from primary feed source was fed into the polymerization reactor at a rate of 5 ml. per minute while simultaneously the secondary polymerizable feed composition was fed into the primary feed source at a rate of 2.27 ml. per minute and thoroughly mixed therein. The two feed source tanks emptied simultaneously and thereafter the contents of the polymerization reactor were stirred at 80° C. for another hour. The product was a fluid, milky latex of a methyl methacrylate (39)/butyl acrylate (59)/acrylic acid (2) polymer having a total solids content of 45 weight percent. A 1.5 mils dry film produced from this latex was flexible and non-tacky.

(B) For comparative purposes a polymer of the same final monomers content was produced by a conventional procedure. A polymerization reactor equipped in the same manner as in Part A was charged with 950 parts of boiled distilled water and one part of the dioctyl ester of sodium sulfosuccinic acid. The contents were heated to 80° C., purged with nitrogen and 1.5 parts of ammonium persulfate were added. A single monomer feed tank was used containing a mixture of 314 parts of methyl methacrylate, 470 parts of butyl acrylate, 16 parts of acrylic acid and 2 parts of the dioctyl ester of sodium sulfosuccinic acid. This mixture of monomers was fed uniformly into the polymerization reactor at a rate of 5 ml. per minute and after all of the monomers had been added the reaction mixture was stirred at 80° C. for another hour. The product was a fluid, milky latex having a total solids content of 45 weight percent. A 1.5 mils film produced from this latex had a tacky surface; it was weak and broke readily upon stretching.

While both latexes have the same comonomers contents the latex of Part A had a broader use temperature range; it exhibited a less abrupt drop in a plot of the transition glass temperature and retained its resistance to flow at higher temperatures than did the latex of Part B. Thus, at 15° C. the stiffness modulus of a film from Part A was 7,200 p.s.i. while that of a similar film from Part B was 710 p.s.i. This ten fold increase in stiffness modulus was completely unexpected and unobvious and could not have been predicted. The use temperature range is the temperature difference between the stiffness modulus of 100,000 p.s.i., which is considered to be the maximum suitable stiffness modulus for a commercially acceptable coating film, and 100 p.s.i., which is considered to be the minimum suitable stiffness modulus. It was found that the polymer of Example 2(A) had a use temperature range of from −14° C. to 38° C., whereas the polymer of Example 2(B) had a use temperature range of −4° C. to 32° C. It is apparent that the polymer of Example 2(A) has a useful range that is 16° C. greater.

EXAMPLE 3

(A) The equipment used was similar to that described in Example 1. The polymerization reactor was charged with 950 parts of boiled distilled water and 0.5 part of the dioctyl ester of sodium sulfosuccinic acid, heated to 80° C., purged with nitrogen and one part of ammonium persulfate was added. The primary polymerizable feed composition in primary feed source initially contained a mixture of 392 parts of butyl acrylate and 8 parts of acrylic acid; the secondary polymerizable feed composition in secondary feed source initially contained 274 parts of methyl methacrylate, 118 parts of butyl acrylate, 8 parts of acrylic acid and 2 parts of the dioctyl ester of sodium sulfosuccinic acid. The contents of the secondary feed source (the secondary polymerizable feed composition) were fed into the primary feed source at a rate of 2.5 ml. per minute and thoroughly mixed therein while simultaneously the primary polymerizable feed composition in the primary feed source was fed into the polymerization reactor at a rate of 5 ml. per minute. The two feed tanks emptied at the same time and thereafter the reaction was continued at 80° C. for another hour with stirring. The product was a fluid, milky latex of a methyl methacrylate (34)/butyl acrylate (64)/acrylic acid (2) polymer having a total solids content of 45 weight percent. A 1.5 mils film produced from this latex was flexible and non-tacky.

(B) For comparative purposes a polymer of the same final monomers content was produced by a conventional procedure. A polymerization reactor equipped in the same manner as in Part A was charged with 950 parts of boiled distilled water and 0.5 part of the dioctyl ester of sodium sulfosuccinic acid. The contents were heated to 80° C., purged with nitrogen and one part of ammonium persulfate was added. A single monomer feed tank was used containing a mixture of 274 parts methyl methacrylate, 510 parts butyl acrylate, 16 parts acrylic acid and 2 parts of the dioctyl ester of sodium sulfosuccinic acid. The mixture of monomers was fed uniformly into the polymerization reactor at a rate of 5 ml. per minute and after all of the mixture had been added the reaction mixture was stirred at 80° C. for another hour. The product was a fluid, milky latex having a total solids content of 45 weight percent. A 1.5 mils film produced from this latex had a tacky surface; it was soft and weak.

The stiffness modulus of a film of polymer of Part A was 14,000 p.s.i. while that of a similar film from Part B was 280 p.s.i. at 15° C. It was completely unexpected that the polymer produced by the process of this invention would have a stiffness modulus at 15° C. that was 50 times higher than the stiffness modulus of a polymer having the same comonomers composition produced by the conventional procedures. The use temperature range of the polymer of Part A was from −13° C. to 42° C., whereas the polymer of Part B had a use temperature range of from −13° C. to 25° C. Thus, the polymer of Part A produced by the process of our invention has a useful temperature range that is 17° C. greater.

Paints were prepared from latexes produced as described above and subjected to a 12 months outdoor exposure test. The paint made with the latex of Part A showed considerably less dirt pick-up than the paint made with the latex of Part B. These paints had the following composition, in pounds:

| | |
|---|---:|
| Water | 213.7 |
| 2-hydroxyethyl cellulose | 4 |
| Mildewicide | 9 |
| Daxad 30 [1] | 6 |
| Potassium tripolyphosphate | 0.7 |
| Nonylphenol ethoxylate [2] | 2.5 |
| Ethylene glycol | 20 |
| Antifoam agent | 2 |
| Titanium dioxide | 250 |
| Magnesium silicate | 75 |
| Calcium carbonate | 100 |
| Latex (from Part A or Part B) | 484 |
| Ammonium hydroxide, 28% | 2 |

[1] The sodium salt of a low molecular weight copolymer of isobutylene and maleic acid.
[2] Having an average of 10.5 oxyethylene groups.

EXAMPLE 4

The equipment used was similar to that described in Example 1. The polymerization reactor was charged with 950 parts boiled distilled water and 0.5 part of the dioctyl ester of sodium sulfosuccinic acid, heated to 80° C., purged with nitrogen and then 2 parts of sodium bicarbonate and 0.75 part of ammonium persulfate were added. The primary feed source initially contained a mixture of 23 parts of methyl methacrylate, 447 parts of butyl acrylate, 10 parts of acrylic acid and 1.5 parts of the dioctyl ester of sodium sulfosuccinic acid as the primary polymerizable feed composition; the secondary feed source initially contained a mixture of 251 parts of methyl methacrylate, 63 parts of butyl acrylate, 6 parts of acrylic acid and 1.5 parts of the dioctyl ester of sodium sulfosuccinic acid as the secondary polymerizable feed composition. The contents of the secondary feed source were fed into the primary feed source at a rate of 2 ml. per minute and thoroughly mixed therein; simultaneously the primary polymerizable feed composition in the primary feed source was fed into the polymerization zone or reactor at a rate of 5 ml. per minute. At that point in time when 400 ml. of the primary polymerizable feed composition had been fed into the polymerization zone or reactor an additional 2 parts of sodium bicarbonate were added to the polymerization reactor. After all of the polymerizable reactants had been added to the polymerization reactor the mixture was stirred at 80° C. for another hour. The product was a fluid, milky latex of a methyl methacrylate (34)/butyl acrylate (64)/acrylic acid (2) polymer having a total solids content of 45 weight percent. At 1.5 mils dry film produced from this latex was flexible and non-tacky.

EXAMPLE 5

The equipment used was similar to that described in Example 1. The polymerization reactor was charged with 950 parts of boiled distilled water and 0.5 part of the dioctyl ester of sodium sulfosuccinic acid, heated to 80° C., purged with nitrogen and then 0.75 part of ammonium persulfate was added. The primary feed source initially contained 25 parts of methyl methacrylate, 485 parts butyl acrylate, 10 parts acrylic acid and 1.5 parts of the dioctyl ester of sodium sulfosuccinic acid as the primary polymerizable feed composition; the secondary feed source initially contained 219 parts methyl methacrylate, 55 parts of butyl acrylate, 6 parts of acrylic acid and 1.5 parts of the dioctyl ester of sodium sulfosuccinic acid as the secondary polymerizable feed composition. At the start of the reaction 240 ml. of primary polymerizable feed composition was fed into the polymerization zone or reactor at a rate of 5 ml. per minute from the primary feed source. After this portion had been added to the polymerization reactor, the flow of secondary polymerizable feed composition from secondary feed source into primary feed source was started and maintained at a rate of 2 ml. per minute and while the contents of the primary feed source were being thoroughly mixed there was a continuous simultaneous flow of the primary polymerizable feed composition therefrom into the polymerization reactor. The two feed sources, primary and secondary, emptied at the same time. Thereafter the contents of the polymerization reactor were stirred at 80° C. for another hour. The procedure followed was one wherein a first portion of the initial primary polymerizable feed composition was reacted in the conventional manner and the reaction was then completed with the balance of the primary polymerizable feed composition reacted by the process of the instant invention using both primary and secondary polymerizable feed compositions. The product was a fluid, milky latex of a methyl methacrylate (34)/butyl acrylate (64)/acrylic acid (2) polymer having a total solids content of 45 weight percent. A 1.5 mils dry film produced from this latex was flexible and non-tacky.

EXAMPLE 6

The equipment used was similar to that described in Example 1. The polymerization reactor was charged with 950 parts of distilled water and 0.5 part of the dioctyl ester of sodium sulfosuccinic acid, heated to 80° C., purged with nitrogen and then 0.75 part of ammonium persulfate was added. The primary feed source initially contained 25 parts of methyl methacrylate, 477 parts of butyl acrylate, 3 parts of acrylic acid, 10 parts of neopentyl glycol diacrylate and 2 parts of the dioctyl ester of sodium sulfosuccinic acid as the primary polymerizable feed composition; the secondary feed source initially contained 200 parts of methyl methacrylate, 85 parts of butyl acrylate, 5 parts of acrylic acid and one part of the dioctyl ester of sodium sulfosuccinic acid as the secondary polymerizable feed composition. This polymerization was carried out in the same manner described in Example 5. At the start 320 parts of the initial primary polymerizable feed composition were fed into the polymerization reactor at a rate of 5 ml. per minute as the sole feed. Thereafter, secondary polymerizable feed composition was fed from the secondary feed source into the primary feed source at a rate of 3.125 ml. per minute and thoroughly mixed therein while simultaneously feeding primary polymerizable feed composition from the primary feed source into the polymerization reactor at a rate of 5 ml. per minute. The two feed sources emptied simultaneously. Thereafter the contents of the polymerization reactor were stirred at 80° C. for another hour. The product was a fluid, milky latex of a methyl methacrylate (27.7)/butyl acrylate (70)/acrylic acid (1)/neopentyl glycol diacrylate (1.3) polymer having a total solids content of 45 weight percent. A 1.5 mils dry film produced from this latex was flexible and non-tacky.

EXAMPLE 7

(A) The equipment used was similar to that described in Example 1. The polymerization reactor was charged with 950 parts of boiled distilled water and 0.5 part of the dioctyl ester of sodium sulfosuccinic acid, heated to 80° C., purged with nitrogen and then two parts of ammonium persulfate were added. The primary feed source initially contained 40 parts of styrene, 448 parts of butyl acrylate, 4 parts of acrylic acid, 8 parts of neopentyl glycol diacrylate and 1.5 parts of the dioctyl ester of sodium sulfosuccinic acid as the primary polymerizable feed composition; the secondary feed source initially contained 120 parts of methyl methacrylate, 100 parts of styrene, 76 parts of butyl acrylate, 4 parts of acrylic acid and 2.5 parts of the dioctyl ester of sodium sulfosuccinic acid as the secondary polymerizable feed composition. At the start 320 parts of the initial primary polymerizable feed composition were fed into the polymerization zone or reactor at a rate of 5 ml. per minute as the sole feed. Thereafter, secondary polymerizable feed composition was fed from the secondary feed source into the primary feed source at a rate of 3.125 ml. per minute and thoroughly mixed therein while simultaneously feeding primary polymerizable feed composition from the primary feed source into the polymerization reactor at a rate of 5 ml. per minute. The two feed sources emptied at the same time. Thereafter the contents of the polymerization reactor were stirred at 80° C. for another hour. The product was a fluid, milky latex of a methyl methacrylate (15)/ styrene (17.5)/butyl acrylate (66.5)/acrylic acid (1)/ neopentyl glycol diacrylate (1) polymer having a total solids content of 45 weight percent. A dry film 1.5 mils thick produced from this latex was flexible and non-tacky.

(B) For comparative purposes a polymer of the same final monomers content was produced by a conventional procedure. A polymerization reactor equipped in the same manner was charged with 950 parts of boiled distilled water and 0.5 part of the dioctyl ester of sodium sulfosuccinic acid, heated to 80° C., purged with nitrogen and two parts of ammonium persulfate were added. A single monomers feed tank was used containing a mixture of 120 parts of methyl methacrylate, 140 parts of styrene, 524 parts of butyl acrylate, 8 parts of acrylic acid, 8 parts of neopentyl glycol diacrylate and 4 parts of the dioctyl ester of sodium sulfosuccinic acid. The monomers mixture was fed uniformly into the polymerization reactor at a rate of 5 ml. per minute and after all of the mixture had been added the reaction mixture was stirred at 80° C. for another hour. The product was a fluid, milky latex having a total solids content of 45 weight percent. A 1.5 mils dry film produced from this latex had a tacky surface; it was soft and weak.

The stiffness modulus of the polymer of Part A was 9,000 while that of Part B was 330 at 15° C. It was a completely unexpected finding that the polymer of Part A produced by the process of this invention would have a stiffness modulus at 15° C. that was about 27 times higher than the stiffness modulus of the polymer of Part B having the same comonomers composition produced by the conventional procedure and that it would have a less abrupt transition region in a plot of transition glass temperatures and thus retain its resistance to flow at higher temperatures. The temperature use range of the polymer of Part A was from −20° C. to 35° C., whereas the polymer of Part B had a use temperature range of from −7° C. to 30° C. Thus, the polymer of Part A produced by the process of our invention has a useful temperature range that is 18° C. greater.

EXAMPLE 8

The equipment used was similar to that described in Example 1. The polymerization reactor was charged with 790 parts of boiled distilled water and 0.5 part of the dioctyl ester of sodium sulfosuccinic acid, heated to 80° C., purged with nitrogen and 2 parts of ammonium persulfate were added. The primary feed source initially contained 115 parts of styrene, 365 parts of ethyl acrylate, 20 parts of acrylic acid, 8 parts of neopentyl glycol diacrylate and 3 parts of the dioctyl ester of sodium sulfosuccinic acid as the primary polymerizable feed composition; the secondary feed source initially contained 120 parts of methyl methacrylate, 125 parts of styrene, 35 parts of ethyl acrylate, 20 parts of acrylic acid and 2 parts of the dioctyl ester of sodium sulfosuccinic acid as the secondary polymerizable feed composition. At the start 320 parts of the initial polymerizable feed composition were fed into the polymerization zone or reactor at a rate of 5 ml. per minute as the sole feed. Thereafter, secondary polymerizable feed composition was fed from the secondary feed source into the primary feed source at a rate of 3.125 ml. per minute and thoroughly mixed therein while simultaneously feeding primary polymerizable feed composition from the primary feed source into the polymerization reactor at a feed rate of 5 ml. per minute. The two feed suorces emptied at the same time. Thereafter the contents of the polymerization reactor were stirred at 80° C. for another hour. The product was a fluid, milky latex of a methyl methacrylate (14.8)/styrene (29.9)/ethyl acrylate (49.5)/acrylic acid (4.95)/neopentyl glycol diacrylate (0.95) polymer having an average particle size of 0.18 micron and a total solids content of 50 weight percent.

To a 50 grams portion of the latex there were added 0.1 gram of p-toluenesulfonic acid in 5 grams of water, 2.6 grams of 3 percent ammonium hydroxide, 2 grams of 2-butoxyethanol and 1.2 grams of hexamethoxymethyl melamine, and the pH was adjusted to 7 to produce a coating composition. Coatings were applied to steel panels and baked at 150° C. for 15 minutes. The dry film was 2 mils thick, clear and glossy, and had a Sward rocker hardness of 56 and a Gardner impact value above 320 in.-lb. The value of 320 in.-lb. recorded was not the maximum for the film but the maximum value measurable on the testing equipment available.

EXAMPLE 9

The equipment used was similar to that described in Example 1. The polymerization reactor was charged with 790 parts of boiled distilled water and 0.5 part of the dioctyl ester of sodium sulfosuccinic acid, heated to 80° C., purged with nitrogen and 2.5 parts of ammonium persulfate added. The primary feed source initially contained 80 parts of styrene, 310 parts of ethyl acrylate, 10 parts of acrylic acid, 8 parts of neopentyl glycol diacrylate and 4 parts of the dioctyl ester of sodium sulfosuccinic acid as the primary polymerizable feed composition; the secondary feed source initially contained 280 parts of styrene, 90 parts of ethyl acrylate, 30 parts of acrylic acid and 4 parts of the dioctyl ester of sodium sulfosuccinic acid as the secondary polymerizable feed composition. The contents of the secondary feed source were fed into the primary feed source at a rate of 2.5 ml. per minute and thoroughly mixed therein; simultaneously the primary polymerizable feed composition in the primary feed source was fed into the polymerization reactor at a rate of 5 ml. per minute. After all of the polymerizable reactants had been added to the reactor the contents thereof were stirred at 80° C. for another hour. The product was a fluid, milky latex of a styrene (44.6)/ethyl acrylate (49.5)/acrylic acid (4.95)/neopentyl glycol diacrylate (0.95) polymer having an average particle size of 0.35 micron and a total solids content of 49 percent by weight.

To a 50 grams portion of the latex there were added 0.1 gram of p-toluenesulfonic acid in 5 parts of water, 0.6 part of 30 percent ammonium hydroxide, 2 parts of 2-butoxyethanol and 1.2 parts of hexamethoxymethyl melamine, and the pH was adjusted to 7. Coatings were applied to steel panels and baked at 150° C. for 15 minutes. The dry film was 2 mils thick, clear and glossy, and had a Sward rocker hardness of 54 and a Gardner impact value above 320 in.-lb.

EXAMPLE 10

(A) The equipment used was similar to that described in Example 1. The polymerization reactor was charged with 600 parts of boiled distilled water and 0.75 part of the dioctyl ester of sodium sulfosuccinic acid, heated to 80° C., purged with nitrogen and 0.6 part of ammonium persulfate then added. The primary feed source initially contained 62.5 parts of methyl methacrylate, 187.5 parts of butyl acrylate, 5 parts of acrylic acid and one part of the dioctyl ester of sodium sulfosuccinic acid as the primary polymerizable feed composition; the secondary feed source initially contained 187.5 parts of methyl methacrylate, 62.5 parts of butyl acrylate, 5 parts of acrylic acid and 1 part of the dioctyl ester of sodium sulfosuccinic acid as the secondary polymerizable feed composition. The contents of the secondary feed source were fed into the primary feed source at a rate of 2.5 ml. per minute and thoroughly mixed therein; simultaneously the primary polymerizable feed composition in the primary feed source was fed into the polymerization zone or reactor at a rate of 5 ml. per minute. The two feed sources emptied at the same time and thereafter the contents of the reactor were stirred at 80° C. for another hour. The product was a fluid, milky latex of a methyl methacrylate (49)/butyl acrylate (49)/acrylic acid (2) polymer having a total solids of 44.9 weight percent. A 1.5 mils dry film was clear and nontacky.

(B) For comparative purposes a polymer of the same final monomers content was produced by adding the monomers as two separate sequential feed to the polymerization zone. A polymerization reactor equipped in the same manner was charged with 800 parts of boiled distilled water and one part of the dioctyl ester of sodium sulfosuccinic acid, heated to 80° C., purged with nitrogen and 0.75 part of ammonium persulfate was then added. A mixture of 49 parts of methyl methacrylate, 147 parts of butyl acrylate, and 0.25 part of the dioctyl ester of sodium sulfosuccinic acid was added to a rate of 5 ml. per minute. Then a second mixture of 147 parts of methyl methacrylate, 49 parts of butyl acrylate, 8 parts of acrylic acid and 0.25 part of the dioctyl ester of sodium sulfosuccinic acid was added at a rate of 5 ml. per minute. Thereafter the contents of the reactor were stirred at 80° C. for another hour. The product was a latex having a total solids content of 34 weight percent; it produced a weak, incompatible film.

(C) Also for comparative purposes another polymer of the same final monomers content was produced by the conventional procedure of adding a single mixture of all of the monomers to the polymerization zone. The reactor was prepared and charged as in Part B above and then a mixture of 196 parts of methyl methacrylate, 196 parts of butyl acrylate, 8 parts of acrylic acid and 0.5 part of the dioctyl ester of sodium sulfosuccinic acid was added at a rate of 5 ml. per minute. Thereafter the contents of the reactor were stirred at 80° C. for another hour; the total solids content was 33.1 weight percent.

The glass transition temperatures of the three products were determined and their plots showed a single smooth broad peak extending over a range of about 30° C. for the polymer from Part A, indicative of a broad temperature use range; two separate and distinct peaks characteristic of two different polymers for the polymer from Part B, with the peaks located about 70° C. apart from each other separated by a deep valley area between them; and a single sharp peak for the polymer from Part C, indicative of a narrow temperature use range.

A series of polymerizations was carried out in which three separate polymerizable feed mixtures were used. In this series a first feed mixture was initially added to the polymerization reactor by itself, this was then followed by the addition to the polymerization zone or reactor of the primary polymerizable feed composition from the primary feed source while simultaneously adding the secondary polymerizable feed composition from the secondary feed source to the primary feed source and thoroughly mixing it therein as described in Example 1. These polymerizations are tabulated below, all figures are in parts in grams by weight unless otherwise specified:

| Example | 11 | 12 | 13 | 14 | 15 |
|---|---|---|---|---|---|
| Polymerization reactor charge: | | | | | |
| Water | 950 | 785 | 785 | 650 | 785 |
| DOSSA | 0.5 | 0.5 | 0.5 | 0.3 | 0.3 |
| Ammonium persulfate (DOSSA=dioctyl ester of sodium sulfosuccinic acid) | 0.75 | 2.0 | 2.0 | 1.5 | 1.5 |
| First feed mixture: | | | | | |
| Methyl methacrylate | 20 | | | 16 | |
| Butyl acrylate | 376 | 264 | 276 | 294 | 310 |
| Acrylic acid | 4 | 2 | 4 | 4 | 4 |
| Neopentyl glycol diacrylate | 5 | 4 | 8 | 4 | 6 |
| Ethyl acrylate | | 25 | 16 | | |
| Styrene | | 25 | 16 | | |
| DOSSA | 1.5 | 1 | 0.5 | 2 | 2 |
| Ammonium persulfate | | 0.5 | 0.5 | 0.5 | 0.5 |
| NPX (20% solution) (NPX=nonyl phenyl polyethylene glycol ether) | | | | 5 | 5 |
| Primary polymerizable feed composition (initial content): | | | | | |
| Methyl methacrylate | | 10 | | | |
| Butyl acrylate | | 188 | 146 | 163 | 156 | 157 |
| Acrylic acid | | 2 | 2 | 2 | 6 | 4 |
| Ethyl acrylate | | | 15 | 5 | 9 | 5 |
| Styrene | | | 15 | 10 | 9 | 9 |
| Acrylonitrile | | | | | | 5 |
| DOSSA | | 1 | 1 | 1 | 3 | 3 |
| Ammonium persulfate | | | 0.5 | 0.5 | | 1 |
| Secondary polymerizable feed composition (initial content): | | | | | |
| Methyl methacrylate | 178 | 120 | 150 | 60 | |
| Butyl acrylate | 20 | 26 | 71 | 34 | 56 |
| Acrylic acid | 2 | 4 | 4 | 6 | 4 |
| Ethyl acrylate | | 50 | 25 | 50 | 35 |
| Styrene | | 100 | 50 | 150 | 170 |
| Acrylonitrile | | | | | 35 |
| DOSSA | 1 | 2 | 1 | 3 | 3 |
| Ammonium persulfate | | 1 | 1 | 1 | 1 |
| Total solids, percent | 44.9 | 49.0 | 49.3 | 51.8 | 48.6 |
| Film properties | (1) | (2) | (3) | (3) | (4) |

[1] Hazy sl. tack.
[2] Hazy dry.
[3] Sl. haze dry.
[4] Clear dry.

In Examples 11 to 15 the first feed mixture was fed to the polymerization reactor charge at 80° C. at a rate of 5 ml. per minute. After all of the first feed mixture had been added the introduction of the primary polymerizable feed composition to the polymerization zone or reactor from the primary feed source and the simultaneous feeding of secondary polymerizable feed composition from the secondary feed source to the primary feed source were started. In all instances the rate of feed of primary polymerizable feed composition was 5 ml. per minute; in Example 11 the rate of feed of secondary polymerizable feed composition was 2.5 ml. per minute and in Examples 12 to 15 it was 3 ml. per minute. After all of the polymerizable reactants had been added to the polymerization reactor the mixture was stirred at 80° C. for another hour. Variations in the procedures were the addition of one part of ammonium persulfate in Examples 12 and 13 and the addition of one gram of ammonium persulfate and 5 grams of a 20 percent aqueous solution of NPX in Examples 14 and 15 to the polymerization reactor before the final heating period; the addition of 0.5 part of ammonium persulfate and 5 parts of 20 percent NPX to the polymerization reactor after one-half of the combined primary and secondary polymerizable feed compositions had been added thereto in Example 14, and the addition of one part of ammonium persulfate and 5 parts of 20 percent NPX at the same period in Example 15. In all instances fluid, milky latexes of the non-uniform polymers were produced.

EXAMPLE 16

The equipment used was similar to that described in Example 1. The polymerization reactor was initially charged with 950 parts of boiled distilled water and 0.5 part of the dioctyl ester of sodium sulfosuccinic acid, heated to 80° C., purged with nitrogen, and 2 parts of ammonium persulfate were then added. A first feed mixture containing 16 parts of styrene, 298 parts of butyl acrylate, 2 parts of methacrylic acid, 4 parts of neopentyl glycol diacrylate, 0.5 part of ammonium persulfate and one part of the dioctyl ester of sodium sulfosuccinic acid was added to the polymerization zone to a rate of 5 ml. per minute as in Example 15. The primary polymerizable feed composition in the primary feed source initially contained 12 parts of styrene, 226 parts of butyl acrylate, 2 parts of methyl methacrylate and one part of the dioctyl ester of sodium sulfosuccinic acid; the secondary polymerizable feed composition in the secondary feed source initially contained 112 parts of styrene, 44 parts of butyl acrylate, 4 parts of methyl methacrylate and one part of the dioctyl ester of sodium sulfosuccinic acid. After the first feed mixture had been added to the polymerization reactor, the primary polymerizable feed composition from the primary feed source was fed into the polymerization zone or reactor at a rate of 5 ml. per minute while simultaneously feeding the secondary polymerizable feed composition from the secondary feed source to the primary feed source at a rate of 2 ml. per minute and thoroughly mixing it therein. After feeding 200 ml. of the primary polymerizable feed composition from the primary feed source to the polymerization reactor, 0.5 part of ammonium persulfate was added to the polymerization zone. After all of the primary and secondary polymerizable feed compositions had been added to the polymerization reactor, a final feed mixture containing 56 parts of methyl methacrylate, 22 parts of butyl acrylate, 2 parts of methacrylic acid and 0.5 part of the dioctyl ester of sodium sulfosuccinic acid was fed to the polymerization reactor at a rate of 5 ml. per minute. At the end of this addition one part of ammonium persulfate was added to the polymerization zone and the reaction mixture was stirred at 80° C. for another hour. A fluid, milky latex was produced having a total solids content of 43.6 percent. Films produced therewith were hazy and slightly tacky.

A series of polymerization reactions was carried out by a procedure similar to that described in Example 1, the details for each example are set forth below, parts are by weight.

| Example | 17 | 18 | 19 | 20 | 21 |
|---|---|---|---|---|---|
| Polymerization reactor charge: | | | | | |
| Water | 610 | 950 | 700 | 750 | 750 |
| DOSSA | 0.75 | 0.5 | 0.4 | 0.5 | 0.5 |
| DHSSA | | | 2.5 | | |
| Ammonium persulfate (DHSSA=dihexyl ester of sodium sulfosuccinic acid) | 0.75 | 0.75 | 2.5 | 2.5 | 2.5 |
| Primary polymerizable feed composition (initial content): | | | | | |
| Methyl methacrylate | | 25 | | | |
| Butyl acrylate | 196 | 462 | | | |
| Acrylic acid | 4 | 5 | 5 | 25 | |
| Tetraethylene glycol dimethacrylate | | 10 | | | |
| Neopentyl glycol diacrylate | | | 8 | 8 | 6 |
| Styrene | | | 105 | 165 | 110 |
| Ethyl acrylate | | | 290 | 220 | 270 |
| DOSSA | 1 | 1.5 | 4 | 4 | 4 |
| Methacrylic acid | | | | | 20 |
| Total solids, percent | 44.4 | 45.3 | 49.1 | 50 | 50.3 |
| Film properties | Brittle | Hazy | Poor | Fair | Fair |
| Gardner impact, in.-lb | | Tacky | 320 | 200 | 320/250 |
| Secondary polymerizable feed composition (initial content): | | | | | |
| Methyl methacrylate | 294 | 214 | | | |
| Butyl acrylate | | 91 | | | |
| Acrylic acid | 6 | 3 | 35 | 65 | |
| Tetraethylene glycol diacrylate | | | | | |
| Neopentyl glycol diacrylate | | | | | |
| Styrene | | | 275 | 275 | 270 |
| Ethyl acrylate | | | 90 | 60 | 90 |
| DOSSA | 1 | 1.5 | 4 | 4 | 4 |
| Methacrylic acid | | | | | 40 |

In Examples 17 to 21 the primary polymerizable feed composition was fed into the polymerization zone or reactor from the primary feed source at a rate of 5 ml. per minute; simultaneously secondary polymerizable feed composition was fed into the primary feed source from the secondary feed source at a rate of 2.5 ml. per minute, with the exception that in Example 19 this rate was 1.923 ml. per minute. and was thoroughly mixed therein. In Example 19 a solution of one part of ammonium persulfate in 100 parts of water was added to the polymerization reactor after all of the polymerizable reactants had been added thereto; in Example 20 a solution of one part of ammonium persulfate in 50 parts of water was added at that time. In Example 21 a solution of one part of ammonium persulfate in 50 parts of water was added to the polymerization reactor at the midpoint of the addition of the sum of the total amounts of primary and secondary polymerizable feed compositions. After all of the reactants had been added to the polymerization reactor the contents were stirred at 80° C. for another hour, except that in Example 20 this period was ten minutes. In all examples fluid milky latexes were obtained.

A series of polymerization reactions was carried out by a procedure similar to that described in Example 5. In this series a portion of the primary polymerizable feed composition in the primary feed zone was fed into the polymerization reactor before the starting the feed of secondary polymerizable feed composition from the secondary feed zone to the primary feed zone; in the table the amount of this portion is indicated by the designation "Uniform feed from primary source." The details for each example are set forth below, wherein the parts are by weight.

zation reaction. In Example 34 one part of the ammonium persulfate in 10 parts of 20 percent NPX was added half way through the polymerization reaction. After all of the reactants had been added to the polymerization reactor the contents were then stirred at 80° C. for another hour. In all instances fluid, milky latexes were produced.

EXAMPLE 35

Following a procedure similar to that described in Example 1 there were initially charged to a polymerization reactor 795 parts of boiled distilled water, 1.68 parts of sodium bicarbonate and 6.24 parts of potassium persulfate. The primary polymerizable feed composition in the primary feed source initially contained 400 parts of ethyl acrylate and 0.3 part of a silicone surfactant; the secondary polymerizable feed composition in the secondary feed source initially contained 259 parts of ethyl acrylate, 80 parts of 2-ethylhexyl acrylate, 32 parts of acrylonitrile, 16 parts of acrylic acid, 13 parts of N-methylol acrylamide and 0.3 part of the silicone surfactant. The contents of the secondary feed source were fed into the primary feed source at a rate of 2 ml. per minute and thoroughly mixed therein; simultaneously the primary polymerizable feed composition in the primary feed source was fed into the polymerization zone or reactor at a rate of 4 ml. per minute. After all of the primary polymerizable feed composition had been added to the polymerization zone the mixture was stirred for

| Example | 22 | 23 | 24 | 24 | 26 | 27 | 28 | 29 | 30 | 31 | 32 | 33 | 34 |
|---|---|---|---|---|---|---|---|---|---|---|---|---|---|
| Polymerization reactor charge: | | | | | | | | | | | | | |
| Water | 950 | 950 | 950 | 950 | 790 | 640 | 790 | 790 | 790 | 790 | 790 | 790 | 790 |
| DOSSA | 0.5 | 0.5 | 0.5 | 0.5 | 0.3 | 0.25 | 0.25 | 0.25 | 0.25 | 0.25 | 0.25 | 0.25 | 0.25 |
| Ammonium persulfate | 1.5 | 1.5 | 1.5 | 3 | 2 | 2 | 1.5 | 2.5 | 2.5 | 2.5 | 1.5 | 2.5 | 2.5 |
| Primary polymerizable feed composition (initial content:) | | | | | | | | | | | | | |
| Methyl methacrylate | | | | | | | 30 | | | | | | |
| Acrylonitrile | 25 | 30 | | | 5 | 7 | | | | | | | |
| Butyl acrylate | 477 | 560 | 458 | 530 | 467 | 521 | 70 | 207 | | | 320 | 320 | 360 |
| Acrylic acid | | 4 | 4 | 4 | 4 | 5 | 10 | 10 | 10 | 10 | | 10 | 10 |
| Neopentyl glycol diacrylate | | 8 | 8 | 8 | 6 | 6 | 8 | 8 | 8 | | 8 | 8 | 8 |
| Styrene | | | 30 | 28 | 9 | 14 | 200 | 60 | 75 | 115 | | | 10 |
| Ethyl acrylate | | | | | 5 | 7 | 180 | 215 | 415 | 375 | 180 | 170 | 120 |
| DOSSA | 1.5 | 1.5 | 1.5 | 1.5 | 5 | 5 | 3 | 3 | 3 | 3 | 3 | 3 | 2 |
| Secondary polymerizable feed composition (initial content): | | | | | | | | | | | | | |
| Methyl methacrylate | 200 | 146 | 150 | 90 | 40 | | 130 | 120 | 120 | 80 | | | |
| Acrylonitrile | | 30 | | | 35 | 35 | | | | | 40 | 40 | |
| Butyl acrylate | 85 | 20 | 96 | 47 | 56 | 37 | 10 | 25 | | | | | |
| Acrylic acid | 8 | 4 | 4 | 4 | 4 | 3 | 30 | 30 | 30 | 30 | 8 | 30 | 30 |
| Styrene | | | 50 | 90 | 130 | 130 | 115 | 100 | 125 | 165 | 160 | 120 | 150 |
| Ethyl acrylate | | | | | 35 | 35 | 15 | 25 | 25 | 25 | 92 | 110 | 120 |
| DOSSA | 1.5 | 1.5 | 1.5 | 2.5 | 3 | 3 | 2 | 2 | 2 | 2 | 2 | 2 | 2 |
| Uniform feed from primary source | 320 | 400 | 320 | 320 | 320 | 400 | 320 | 320 | 320 | 320 | 320 | 320 | 320 |
| Total solids, percent | 44.6 | 41.3 | 43.1 | 42.9 | 48.5 | 54.0 | 45.8 | 49.3 | 50.0 | 49.3 | 46.8 | 48.6 | 48.4 |
| Film properties | (1) | (2) | (2) | (3) | (4) | (5) | Soft | | | | (4) | (6) | (3) |
| Gardner impact, in.-lb. | | | | | | | 32/0 | 320 | 320 | 100/24 | | | |
| Sward hardness | | | | | | | 54 | | 22 | | 36 | | |

[1] Slight haze, slight tack.  [2] Hazy, dry.  [3] Hazy, slight tack.  [4] Slight haze, dry.  [5] Slight tack.  [6] Clear, dry.

After that portion in Examples 22 to 34 identified as "Uniform feed from primary source" was fed into the polymerization zone or reactor at a rate of 5 ml. per minute from the primary feed source, the rate of feed of primary polymerizable feed composition from primary feed source to the polymerization reactor was maintained at 5 ml. per minute while simultaneously feeding secondary polymerizable feed composition from the secondary feed source into the primary feed source at a rate of 3 ml. per minute, except that the rate was 2.5 ml. per minute in Examples 23 and 25. In Examples 26, 27 and 28 one part of ammonium persulfate in 5 parts of 20 percent NPX was added to the polymerization reactor after addition of the "Uniform feed from primary source" and another similar portion was added after all of the polymerizable reactants had been added to the ploymerization reactor. In Examples 29, 30 and 31, one part of ammonium persulfate in 5 parts of 20 percent NPX was added to the polymerization reactor after addition of the "Uniform feed from primary scource." In Example 32 ten parts of 20 percent NPX were added at the end of feed. In Example 33 one part of ammonium persulfate in 10 parts of water was added to the polymerization reactor half way through the addition of the polymerianother hour at 80° C. A fluid, milky latex of an ethyl acrylate (82)/2-ethylhexyl acrylate (10)/acrylonitrile (4)/acrylic acid (2)/N-methylol acrylamide (1.6) polymer having a total solids content of 49.2 percent was obtained that was used to produce a soft, very tacky film at room temperature.

EXAMPLE 36

Following a procedure similar to that described in Example 1 there were initially charged to a polymerization reactor 800 parts of boiled distilled water, 1.5 parts of sodium bicarbonate, 23 parts of itaconic acid and 4.5 parts of potassium persulfate. The primary polymerizable feed composition in the primary feed source initially contained 166 parts of ethyl acrylate, 218 parts of methyl methacrylate, and 0.8 part of silicon surfactants; the secondary polymerizable feed composition in the secondary feed source initially contained 270 parts of ethyl acrylate, 100 parts of methyl methacrylate, 16 parts of glycidyl acrylate, and 0.8 part of silicone surfactants. The contents of the secondary feed source fed into the primary feed source at a rate of 2.5 ml. per minute and thoroughly mixed therein; simultaneously the primary polymerizable feed composition in the primary feed source was fed into the polymerization zone or reactor at a rate of 5 ml. per minute. After all of the reactants had been added to the polymerization zone the contents therein were stirred at 80° C. for one hour. A fluid, milky latex of an ethyl acrylate (57)/methyl methacrylate (41)/glycidyl acrylate (2) polymer having a total solids content of 49.4 percent was produced. It formed cloudy, tough and non-tacky films at room temperature. Seedy particles were readily removed by conventional filtration or centrifugation.

EXAMPLE 37

Following a procedure similar to that described in Example 1 there were initially charged to a polymerization reactor 620 parts of boiled distilled water, 23 parts of polyethylene glycol surfactant, 3.8 parts of hydroxylethyl cellulose, 4.2 parts of sodium lauryl sulfate, 5.8 parts of ethylene glycol, 1.7 parts of sodium acetate, 56 parts of vinyl acetate, 19 parts of butyl acrylate and 0.4 part of potassium persulfate and the mixture was heated to 70° C. The primary polymerizable feed composition in the primary feed source initially contained 206 parts of vinyl acetate and 134 parts of isobutyl acrylate; the secondary polymerizable feed composition in the secondary feed source initially contained 300 parts of vinyl acetate and 40 parts of isobutyl acrylate. The contents of the secondary feed source were fed into the primary feed source at a rate of 2.5 ml. per minute and thoroughly mixed therein; simultaneously the primary polymerizable feed composition in the primary feed source was fed into the polymerization zone or reactor at a rate of 5 ml. per minute at a polymerization reactor temperature of about 85° C. After all of the reactants had been added to the polymerization zone a mixture of 1.2 parts of potassium persulfate in 60 ml. of water was added and the contents were stirred another hour at 85° C. A fluid milky latex of a vinyl acetate (75)/isobutyl acrylate (25) polymer was produced having a total solids content of 46.7 percent. The latex produced non-tacky film coatings at room temperature having good leveling and good elongation properties.

EXAMPLE 38

Following a procedure similar to that described in Example 1 there were initially charged to a polymerization reactor 620 parts of boiled distilled water, 23 parts of polyethylene glycol surfactant, 3.8 parts of hydroxylethyl cellulose, 4.2 parts of sodium lauryl sulfate, 5.8 parts of ethylene glycol, 1.7 parts of sodium acetate, 40 parts of the vinyl ester of versatic acid (saturated tertiary carboxylic acid of 10 carbon atoms) and 0.5 part of potassium persulfate and the mixture was heated to 70° C. The primary polymerizable feed composition in the primary feed source initially contained 80 parts of vinyl acetate and 260 parts of the vinyl ester of versatic acid; the secondary polymerizable feed composition in the secondary feed source initially contained 260 parts of vinyl acetate and 80 parts of the vinyl ester of versatic acid. The contents of the secondary feed source were fed into the primary feed source at a rate of 2 ml. per minute and thoroughly mixed therein; simultaneously the primary polymerizable feed composition in the primary feed source was fed into the polymerization zone or reactor at a rate of 4 ml. per minute. After all of the reactants had been added a solution of 1.5 parts of potassium persulfate in 75 parts of water was added and the reactor contents were stirred for another hour at 85° C. A fluid, milky latex of a vinyl acetate (50)/vinyl ester of versatic acid (50) polymer was produced having a total solids content of 46.4 percent. The latex formed a clear, very flexible, tacky film at room temperature.

EXAMPLE 39

Following a procedure similar to that described in Example 1 there were charged to a polymerization reactor 620 parts of boiled distilled water, 23 parts of polyethylene glycol surfactant, 3.8 parts of hydroxyethyl cellulose, 4.2 parts of sodium lauryl sulfate, 5.8 parts of ethylene glycol, 1.7 parts of sodium acetate, 56 parts of vinyl acetate, 19 parts of isobutyl acrylate and 0.5 part of potassium persulfate and the mixture was heated to 70° C. The primary polymerizable feed composition in the primary feed source initially contained 206 parts of vinyl acetate and 134 parts of di-n-butyl maleate; the secondary polymerizable feed composition in the secondary feed source intially contained 300 parts of vinyl acetate and 40 parts of isobutyl acrylate. The contents of the secondary feed source were fed into the primary feed source at a rate of 2.5 ml. per minute and thoroughly mixed therein; simultaneously the primary polymerizable feed composition in the primary feed source was fed into the polymerization zone or reactor at a rate of 5 ml. per minute at a temperature of about 85° C. After all of the reactants had been added a solution of 1.5 parts of potassium persulfate in 75 parts of water was added and the reactor contents were stirred another hour at 85° C. A fluid, milky latex of a vinyl acetate (74)/di-n-butyl maleate (18)/isobutyl acrylate (8) polymer having a total solids content of 43.8 percent was obtained. It produced a clear, non-tacky film coating at room temperature.

EXAMPLE 40

Following a procedure similar to that described in Example 1 there were charged to a polymerization reactor 595 parts of water, 28 parts of polyethylene glycol surfactant, 4.5 parts of sodium vinyl sulfonate, 5 parts of sodium lauryl sulfate, 1.5 parts of sodium bicarbonate, 65 parts of vinyl acetate, 11 parts of 2-ethylhexyl acrylate and 0.5 part of potassium persulfate and the mixture was heated to 70° C. The primary polymerizable feed composition in the primary source initially contained 200 parts of vinyl acetate, 103 parts of vinyl propionate and 39 parts of 2-ethylhexyl acrylate; the secondary polymerizable feed composition present in the secondary feed source initially contained 290 parts of vinyl acetate and 52 parts of 2-ethylhexyl acrylate. The contents of the secondary feed source were fed into the primary feed source at a rate of 2.5 mo. per minute; simultaneously the primary polymerizable feed composition in the primary feed source was fed into the polymerization zone or reactor at a rate of 5 ml. per minute at a temperature of about 85° C. After all of the reactants had been added a solution of 2 parts of potassium persulfate in 75 parts of water was added and the reactor contents were stirred for another hour at about 85° C. A fluid, milky latex of a vinyl acetate (72)/2-ethylhexyl acrylate (13)/vinyl propionate (13)/sodium vinyl sulfonate (0.6) polymer having a total solids content of 48.6 percent was produced. It formed a clear, slightly tacky film at room temperature.

EXAMPLE 41

A polymerization reaction system was set up consisting of one gallon pressure autoclave, a pump to introduce catalyst feed thereto, a pressure tank to feed gaseous ethylene into the top of the autoclave, a stirrer-equipped primary feed source or tank to feed primary polymerizable feed composition directly into the top of the autoclave, a secondary feed source or tank to feed secondary polymerizable feed composition to the primary feed source, and suitable pumps. The primary and secondary feed tanks were stainless steel pressure tanks.

The catalyst feed was a solution of 10.8 grams of ammonium persulfate, 10.8 grams of sodium acetate and 216 grams of water. It was fed in at a rate of 39.6 grams per hour.

A monomers solution, designated as Solution A, was prepared containing 18 grams of neopentyl glycol diacrylate and 2,502 grams of vinyl acetate.

The primary polymerizable feed composition in the primary feed source initially contained 720 grams of Solution A.

The secondary polymerizable feed composition in the secondary feed source initially contained 588 grams of vinyl chloride and 492 grams of Solution A.

The autoclave was initially charged with 36 grams of nonylphenyl polyethylene glycol ether surfactant, 360 grams of a 10 percent aqueous solution of hydroxyethyl cellulose, 27 grams of a 30 percent aqueous solution of sodium lauryl sulfate, 1.8 grams of ammonium persulfate, 1.8 grams of sodium acetate and 1,342 grams of water and heated to 70° C. Ethylene was fed into the polymerization reactor at a rate to maintain a constant pressure of 630 p.s.i. at a reaction temperature of 80° C. throughout almost the entire polymerization reaction. At the start of the reaction 270 grams of Solution A was fed into the mixture in the autoclave from the primary feed source at a rate of 600 grams per hour. After this 270 gram portion had been delivered, the flow of secondary polymerizable feed composition from the secondary feed source into the primary feed source was started and continued at a feed rate of 450 grams per hour; simultaneously primary polymerizable feed composition in the primary feed source was being fed into the autoclave or polymerization zone at a rate of 600 grams per hour. These feeds were continued until a total of 1,710 grams of polymerizable reactants from the primary feed source had been fed to the autoclave, a total of about 2.85 hours. The reaction pressure was maintained at 630 p.s.i. by the pressure-feeding of ethylene until 89 percent of the primary polymerizable feed composition had been added to the autoclave via the primary feed source. At that point the ethylene supply was turned off and the pressure allowed to drift. After completion of the addition of the primary polymerizable feed composition the contents of the autoclave were heated for five hours; during the first three hours of which the catalyst feed was continued. After cooling and depressurizing there was recovered a fluid, milky latex of a vinyl acetate (69.5)/vinyl chloride(30)/neopentyl glycol diacrylate (0.5) polymer having a total solids content of 52.7 percent. The average particle size of the polymer was 0.43 micron. A clear, non-tacky film was produced.

EXAMPLE 42

Following a procedure similar to that described in Example 1 there were charged to a polymerization reactor 800 grams of boiled distilled water, 0.5 gram of the dioctyl ester of sulfosuccinic acid and 2.5 grams of ammonium persulfate and the mixture was heated to about 70° C. The primary polymerizable feed composition in the primary feed source initially contained 40 grams of methyl methacrylate, 338 grams of butyl acrylate, 14 grams of methacrylonitrile, 8 grams of acrylic acid, 8 grams of neopentyl glycol diacrylate and 4 grams of the dioctyl ester of sulfonsuccinic acid; the secondary polymerizable feed composition in the secondary feed source initially contained 200 grams of methyl methacrylate, 142 grams of butyl acrylate, 50 grams of methacrylonitrile, 8 grams of acrylic acid and 4 grams of the dioctyl ester of sulfosuccinic acid. The contents of the secondary feed source were fed into the primary feed source at a rate of 2.5 ml. per minute; simultaneously the primary polymerizable feed composition in the primary feed source was fed into the polymerization zone or reactor at a rate of 5 ml. per minute at a reactor temperature of about 85° C. Thereafter the contents of the polymerization zone were stirred for another hour. A fluid, milky latex of a methyl methacrylate (30)/butyl acrylate (60)/methacrylonitrile (8)/acrylic acid (2) polymer was obtained having a total solids content of 49.3 percent. It formed a slightly tacky film at room temperature.

EXAMPLE 43

Following a procedure similar to that described in Example 1 there were charged to a polymerization reactor 775 grams of boiled distilled water, 3 grams of the dihexyl ester of sulfosuccinic acid and 2.5 grams of ammonium persulfate and the mixture was heated to about 70° C. The primary polymerizable feed composition in the primary feed source initially contained 80 grams of styrene, 280 grams of ethyl acrylate, 20 grams of acrylic acid, 24 grams of divinyl benzene and 4 grams of the dioctyl ester of sulfosuccinic acid; the secondary polymerizable feed composition present in the secondary feed source initially contained 280 grams of styrene, 80 grams of ethyl acrylate, 40 grams of acrylic acid and 4 grams of the dioctyl ester of sulfosuccinic acid. The contents of the secondary feed source were fed into the primary feed source at a rate of 2.5 ml. per minute; simultaneously the primary polymerizable feed composition in the primary feed source was fed into the polymerization zone or reactor at a rate of 5 ml. per minute at a reactor temperature of about 85° C.; thereafter a solution of 0.5 gram of ammonium persulfate in 25 ml. of water was added and the contents were stirred for another hour. A fluid, milky latex of a polymer of styrene (47.5)/ethyl acrylate (45)/acrylic acid (7.5) containing 0.75 percent divinyl benzene and having a total solids content of 48.5 percent and an average particle size of 0.37 micron was produced.

A coating composition was prepared as described in the last paragraph of Example 8. After applying to steel panels and baking at 150° C. for 15 minutes the dry films had a Sward rocker hardness of 54, Gardner impact values of 320/320 in.-lb., a pencil hardness of H and good gloss.

EXAMPLE 44

Following a procedure similar to the described in Example 1 there were charged to a polymerization reactor 800 grams of boiled distilled water, 2.5 grams of the dihexyl ester of sulfosuccinic acid and 2.5 grams of ammonium persulfate and the mixture was heated to about 70° C. The primary polymerizable feed composition in the primary feed source initially contained 75 grams of styrene, 135 grams of ethylacrylate, 75 grams of phenoxyethyl acrylate, 15 grams of acrylic acid, 4 grams of neopentyl glycol diacrylate and 3 grams of the dioctyl ester of sulfosuccinic acid; the secondary polymerizable feed composition in the secondary feed source initially contained 210 grams of styrene, 75 grams of ethyl acrylate, 15 grams of acrylic acid and 3 grams of the dioctyl ester of sulfosuccinic acid. The contents of the secondary feed source were fed into the primary feed source at a rate of 2.5 ml. per minute; simultaneously the primary polymerizable feed composition in the primary feed source was fed into the polymerization zone or reactor at a rate of 5 ml. per minute at a reactor temperature of about 85° C.; thereafter a solution of 0.5 gram of ammonium persulfate in 25 ml. of water was added and the contents of the reactor were stirred for another hour. A fluid, milky latex of a styrene (47.5)/phenoxyethyl acrylate (12.5)/ethylacrylate (35)/acrylic acid (5) polymer containing 0.75 percent neopentyl glycol diacrylate and having a total solids content of 40.7 percent was obtained.

A coating composition was prepared as described in the last paragraph of Example 8. A fairly brittle film resulted having Gardner impact values of 50/5 in.-lb., a pencil hardness of 2H and fair gloss.

EXAMPLE 45

Following a procedure similar to that described in Example 1 there were charged to a polymerization reactor 800 grams of boiled distilled water, 2.5 grams of the dihexyl ester of sulfosuccinic acid and 2.5 grams of ammonium persulfate and the mixture was heated to about 70° C. The primary polymerizable feed composition in the primary feed source initially contained 15 grams of styrene, 60 grams of p-chlorostyrene, 210 grams of ethyl acrylate, 15 grams of acrylic acid, 4 grams of neopentyl glycol diacrylate and 3 grams of the dioctyl ester of sulfosuccinic acid; the secondary polymerizable feed composition in the secondary feed source initially contained 210 grams of styrene, 75 grams of ethyl acrylate, 15 grams of acrylic acid and 3 grams of the dioctyl ester of sulfosuccinic acid. The contents of the secondary feed source were fed into the primary feed source at a rate of 2.5 ml. per minute; simultaneously the primary polymerizable feed composition in the primary feed source was fed into the polymerization zone or reaction at a rate of 5 ml. per minute at a reactor temperature of about 85° C.; thereafter a solution of 0.5 gram of ammonium persulfate in 25 ml. of water was added and the contents of the reactor were stirred for another hour. A fluid, milky latex of a styrene (37.5)/p-chlorostyrene (10)/ethyl acrylate (47.5)/acrylic acid (5) polymer containing 0.75 percent neopentyl glycol diacrylate and having a 42 percent total solids content was obtained.

A coating composition was prepared as described in the last paragraph of Example 8. The cured coating had a Sward rocker hardness of 50, Gardner impact values of 200/100 in.-lb., pencil hardness of H and good gloss.

EXAMPLE 46

Following a procedure similar to that described in Example 1 there were charged to a polymerization reactor 775 grams of boiled distilled water, 2.5 grams of the dihexyl ester of sulfosuccinic acid and 2 grams of ammonium persulfate and the mixture was heated to about 70° C. The primary polymerizable feed composition in the primary feed source initially contained 100 grams of styrene, 280 grams of ethyl acrylate, 20 grams of acrylic acid, 4 grams of pentaerythritol triacrylate and 4 grams of the dioctyl ester of sulfosuccinic acid; the secondary polymerizable feed composition in the secondary feed source initially contained 280 grams of styrene, 80 grams of ethyl acrylate, 40 grams of acrylic acid and 4 grams of the dioctyl ester of sulfosuccinic acid. The contents of the secondary feed source were fed into the primary feed source at a rate of 2.5 ml. per minute; simultaneously the primary polymerizable feed composition in the primary feed source was fed into the polymerization zone or reactor at a rate of 5 ml. per minute at a reactor temperature of about 85° C.; thereafter a solution of 0.5 gram of ammonium persulfate in 25 ml. of water was added and the contents of the reactor were stirred for another hour at about 85° C. A fluid, milky latex of a styrene (47.5)/ethyl acrylate (45)/acrylic acid (7.5) polymer containing 0.5 percent pentaerythritol triacrylate and having a 48.3 percent total solids content was obtained.

A coating composition was prepared as described in the last paragraph of Example 8. The cured coating had a Sward rocker hardness of 56, Gardner impact values of 320/320 in.-lb., pencil hardness of 2H and good gloss.

The glass transition temperatures of the polymers of Examples 35 to 42 were determined and are recorded below:

| Example: | $T_g$, °C. |
|---|---|
| 35 | 0 |
| 36 | 30 |
| 37 | 29 |
| 38 | 8 |
| 39 | 23 |
| 40 | 22 |
| 41 | 15 |
| 42 | −1 |

EXAMPLE 47

In this example a single primary feed source and two secondary feed sources connected in series were used; in all other respects the equipment used was similar to that described in Example 1. The polymerization reactor was charged with 775 parts of boiled distilled water and 2 parts of the dihexyl ester of sulfosuccinic acid, heated to 80° C., purged with nitrogen and 2 parts of ammonium persulfate were added. The primary feed source initially contained 170 parts of styrene, 70 parts of ethyl acrylate, 20 parts of acrylic acid, 2 parts of neopentyl glycol diacrylate and 2.6 parts of the dioctyl ester of sulfosuccinic acid as the primary polymerizable feed composition. As indicated, two secondary feed sources, in series, were used. The first secondary feed source feeding directly into the primary feed source shall be identified as "secondary feed source A" and the second secondary feed source feeding into secondary feed source A shall be identified as "secondary feed source B." Secondary feed source A initially contained 240 parts of ethyl acrylate, 20 parts of acrylic acid, 2 parts of neopentyl glycol diacrylate and 2.6 parts of the dioctyl ester of sulfosuccinic acid as secondary polymerizable feed composition A; secondary feed source B initially contained 220 parts of styrene, 20 parts of ethyl acrylate, 20 parts of the acrylic acid and 2.6 parts of the dioctyl ester of sulfosuccinic acid as secondary polymerizable feed composition B. Primary polymerizable feed composition from primary feed source was fed into the polymerization reactor at a rate of 5 ml. per minute. Simultaneously, secondary polymerizable feed composition A from secondary feed source A was fed into primary feed source at a rate of 3.33 ml. per minute and secondary polymerizable feed composition B from secondary feed source B fed in series into secondary feed source A at a rate of 1.67 ml. per minute. The contents of primary feed source and secondary feed source A were continuously stirred to assure good mixing; the feeding sequences caused a continual change in the compositional contents of the reactants of the primary polymerizable feed composition in the primary feed source and of the secondary polymerizable feed composition A in secondary feed source A during the reaction and thus a continual change in the compositional content of the reactants entering the polymerization reactor. The three feed sources emptied simultanously. At the end of the feed, a solution of 0.5 part of ammonium persulfate in 25 parts of water was added to the polymerization reactor and the contents thereof were stirred at 80° C. for one hour. A fluid, milky latex of a styrene/ethyl acrylate/acrylic acid/neopentyl glycol diacrylate polymer was obtained having a total solids content of 48.9 percent and an average particle size of 0.43 micron.

A coating composition was prepared as described in the last paragraph of Example 8 and cured at 200° C. for 5 minutes. The cured film was glossy and had a Sward rocker hardness value of 68, a Gardner impact value of 320/320 in.-lb. (front and reverse) and a pencil hardness rating of H.

EXAMPLE 48

In this example two primary feed sources feeding in parallel to the polymerization zone and a secondary feed source feeding into each primary feed source were used; in all other respects the equipment used was similar to that described in Example 1. The polymerization reactor was charged with 775 parts of boiled distilled water and 2 parts of the dihexyl ester of sulfosuccinic acid, heated to 80° C., purged with nitrogen and 2 parts of ammonium persulfate were added. As indicated, two primary feed sources, in parallel, were used, with each feeding directly into the polymerization zone. The two primary feed sources each initially contained 60 parts of styrene, 130 parts of ethyl acrylate, 10 parts of acrylic acid, 2 parts of neopentyl glycol diacrylate and 2 parts of the dioctyl ester of sulfosuccinic acid as the primary polymerizable feed compositions; the two secondary feed sources each initially contained 120 parts of styrene, 60 parts of ethyl acrylate, 20 parts of acrylic acid and 2 parts of the dioctyl ester of sulfosuccinic acid as the secondary polymerizable feed compositions. Primary polymerizable feed compositions from the two primary feed sources were fed into the polymerization reactor at a rate of 2.5 ml. per minute from each primary feed source. Simultaneously, secondary polymerizable feed compositions from each respective seccondary feed source were feeding into their respective primary feed sources at a rate of 1.25 ml. per minute each, with the contents of the primary feed sources being thoroughly mixed during the addition sequences. All of the feed sources emptied simultaneously and then a solution of 0.5 part of ammonium persulfate in 25 ml. of water was added to the polymerization reactor and the contents thereof were stirred at 80° C. for one hour. A fluid, milky latex of a styrene/ethyl acrylate/acrylic acid/neopentyl glycol diacrylate polymer was obtained having a total solids content of 48.5 percent and an average particle size of 0.44 micron.

A coating composition was prepared and cured as described in Example 47. The cured film was glossy and had a Sward rocker hardness value of 64, a Gardner impact value of 320/320 in.-lb. and a pencil hardness rating of H.

We claim:

1. A process for producing a polymer comprising introducing at least one primary polymerizable feed composition from at least one primary feed source to a polymerization zone, said primary polymerizable feed composition continually varying in compositional content of the polymerizable reactants therein during said continuous introduction; simultaneously adding to said primary feed source at least one different secondary polymerizable feed composition from at least one secondary feed source so as to continually change the compositional content of the polymerizable reactants of said primary polymerizable feed composition in said primary feed source; and continuously polymerizing the primary polymerizable feed composition introduced to the polymerization zone until desired polymerization has been achieved.

2. A process as claimed in claim 1 wherein a single primary feed source introduces primary polymerizable feed composition to the polymerization zone while a single secondary feed source simultaneously introduces secondary polymerizable feed composition to said primary feed source.

3. A process as claimed in claim 1 wherein a single primary feed source introduces primary polymerizable feed composition to the polymerization zone while at least two secondary feed sources simultaneously introduce secondary polymerizable feed composition to said primary feed source.

4. A process as claimed in claim 3 wherein at least two secondary feed sources introduce secondary polymerizable feed composition to said primary feed source in parallel.

5. A process as claimed in claim 3 wherein at least two secondary feed sources introduce secondary polymerizable feed composition to said primary feed source in series.

6. A process as claimed in claim 3 wherein the feed of secondary polymerizable feed composition from said secondary feed sources is a combination of parallel and series feeding.

7. A process as claimed in claim 1 wherein at least two primary feed sources introduce primary polymerizable feed composition to the polymerization zone while a single secondary feed source simultaneously introduces secondary polymerizable feed composition to at least one of said primary feed sources.

8. A process as claimed in claim 1 wherein at least two primary feed sources introduce primary polymerizable feed composition to the polymerization zone while at least two secondary feed sources simultaneously introduce secondary polymerizable feed composition to at least one of said primary feed sources.

9. A process as claimed in claim 8 wherein at least two secondary feed sources introduce secondary polymerizable feed composition to at least one of said primary feed sources in parallel.

10. A process as claimed in claim 8 wherein at least two secondary feed sources introduce secondary polymerizable feed composition to at least one of said primary feed sources in series.

11. A process as claimed in claim 8 wherein the feed of secondary polymerizable feed composition from said secondary feed sources is a combination of parallel and series feeding.

12. A process as claimed in claim 1 wherein for a selected period of time the feeding of secondary polymerizable feed composition from secondary feed source to primary feed source is suspended, said period being less than the entire period required for feeding the primary polymerizable feed composition from primary feed source to the polymerization zone.

13. A polymer produced by the process of claim 1.

References Cited
UNITED STATES PATENTS

| | | | |
|---|---|---|---|
| 3,448,173 | 6/1969 | Ryan et al. | 260—876 |
| 3,562,235 | 2/1971 | Ryan | 260—885 |

STANFORD M. LEVIN, Primary Examiner

U.S. Cl. X.R.

260—296 S, 78.5 E, 78.5 R, 79.7, 80 M, 80.72, 80.73, 80.78, 80.8, 80.81, 85.7, 956; 117—132 B